April 4, 1933.　　B. F. BARNES　　1,903,277
SINK CLEANING UTENSIL
Filed April 11, 1930
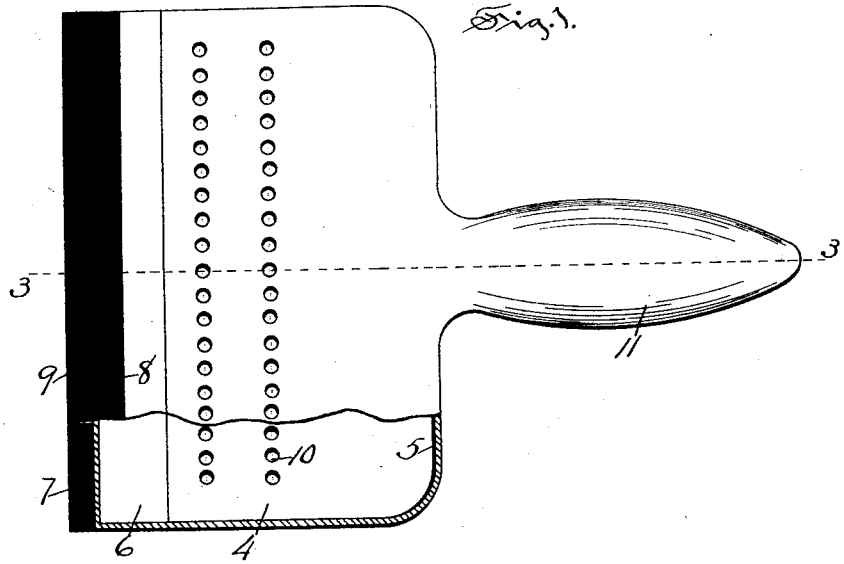
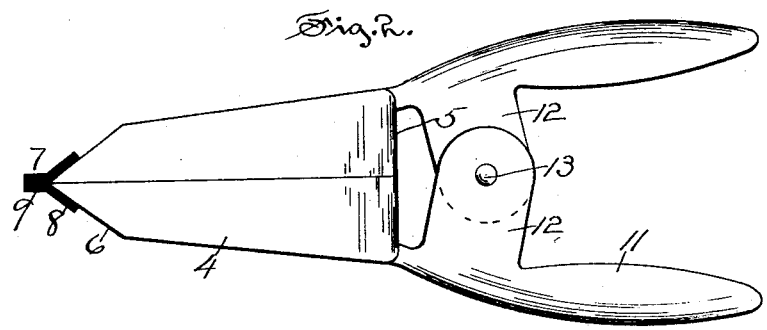
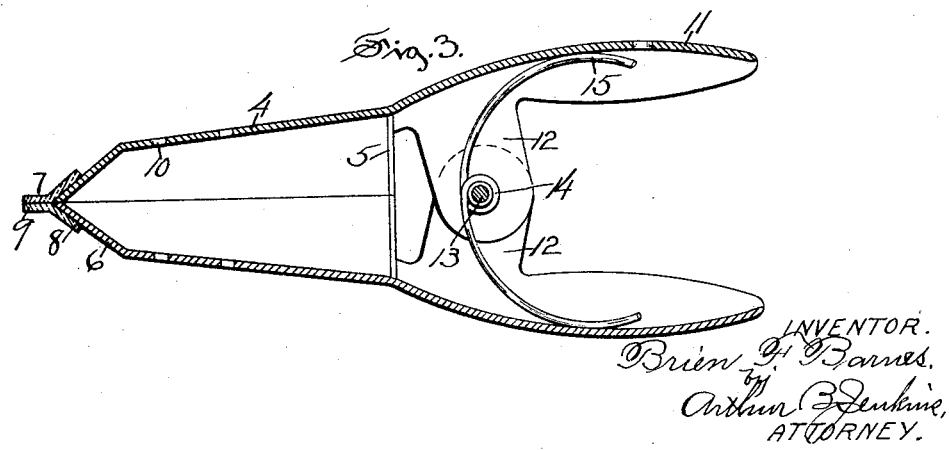

Patented Apr. 4, 1933

1,903,277

UNITED STATES PATENT OFFICE

BRIEN F. BARNES, OF HARTFORD, CONNECTICUT

SINK CLEANING UTENSIL

Application filed April 11, 1930. Serial No. 443,342.

My invention relates to the class of devices that are particularly employed for gathering up refuse from kitchen sinks and similar places, and an object of my invention, among others, is the provision of a utensil of this sort that shall be particularly handy to use and that shall be effective in the results attained by such use.

One form of a kitchen utensil embodying my invention, and in the construction and use of which, the objects herein set out, as well as others may be attained, is illustrated in the accompanying drawing, in which—

Figure 1 is a face view of my improved kitchen utensil with one of the blades or pans broken away to show construction, the other blade being cut in section.

Figure 2 is an end view of the same.

Figure 3 is a view in section on a plane denoted by the dotted line 3—3 of Figure 1.

In the accompanying drawing, the numeral 4 denotes blades or cleaning pans, of which there are two, of duplicate construction and each of which is formed of a shape similar to a dust pan having a back 5 forming a flange extending inwardly from each end of the pan. The front portions of the pans are shallower than the rear parts and the front edges are beveled forming aprons 6. A collector 7 is secured to the front of each blade or pan, these collectors being composed of flexible material as rubber, as shown in the drawing, and each consisting of a base strip 8 which is secured to the tapered portion or apron 6 of each pan in any suitable manner, as by an adhesive or otherwise. The outer edges of the collectors constitute lips 9 located at angles to the bases 8 and resting in contact with each other, as shown in Figures 2 and 3 of the drawing. The blades or pans may be provided with perforations 10, if desired, as a means for draining the utensil of liquid contents therein.

Handles 11 are extended backwardly from the center of the blades or pans, as shown in Figure 1, and these handles are preferably curved into trough shape to afford a convenient shape for grasping the handles. A pair of ears 12 are extended from the edges of each handle inwardly, the ears on the two parts of the utensil lapping past one another. A pivot 13 is extended through the ears on each side of the handles 11, as shown in Figures 2 and 3 of the drawing, and a spring 14 is wrapped around this pivot that preferably extends across the space between the ears on each handle. The branches 15 of the spring are extended into and along the handles 11, serving to press the handles apart and the pans or blades into contact with each other.

In use the handles are grasped by the user and pressed toward each other thus opening the blades or pans apart, and the lip 9 on one of the pans may be used to scrape up refuse and to direct it over the edge of the apron into the pan. The pans may be used either side up, and when sufficient refuse has been collected release of pressure on the handles will cause the spring to force the blades or pans toward each other squeezing the material therein thereby removing a portion of the liquid from such material.

In accordance with the provisions of the patent statutes I have described the principles of operation of my invention together with the device which I now consider to represent the best embodiment thereof; but I desire to have it understood that the device shown is only illustrative, and that the invention may be carried out by other means and applied to uses other than those above set out.

I claim:

1. A sink cleaning utensil including two blades of pan shape having raised front edges creating dams to retain matter therein, means for pivotally connecting said blades, handles extending from said blades, and collectors of flexible material secured to the raised front edges of said blades and extending forwardly therefrom in contact when the blades are closed.

2. A sink cleaning utensil including two blades one at least of which is of pan shape having a raised front edge creating a dam to retain matter therein, means for pivotally connecting said blades, handles extending from said blades, and collectors of flexible material secured to the front edges of said blades and extending forwardly therefrom in contact when the blades are closed.

BRIEN F. BARNES.